(12) United States Patent
Lee et al.

(10) Patent No.: US 12,308,899 B2
(45) Date of Patent: May 20, 2025

(54) COMPOSITE COIL PATTERN FOR WIRELESS CHARGING AND MAGNETIC SECURE TRANSMISSION

(71) Applicant: HAESUNG DS CO., LTD., Changwon-si (KR)

(72) Inventors: Ki Min Lee, Seoul (KR); Sang Hak Lee, Gyeonggi-do (KR); Dong Hyuk Lee, Seoul (KR)

(73) Assignee: HAESUNG DS CO., LTD., Changwon-si (KR)

( * ) Notice: Subject to any disclaimer, the term of this patent is extended or adjusted under 35 U.S.C. 154(b) by 556 days.

(21) Appl. No.: 17/342,028

(22) Filed: Jun. 8, 2021

(65) Prior Publication Data
US 2022/0021415 A1    Jan. 20, 2022

(30) Foreign Application Priority Data

Jul. 20, 2020 (KR) .......................... 10-2020-0089851
Sep. 28, 2020 (KR) .......................... 10-2020-0126380

(51) Int. Cl.
*H04B 5/00* (2024.01)
*H01Q 1/22* (2006.01)
(Continued)

(52) U.S. Cl.
CPC .............. *H04B 5/79* (2024.01); *H01Q 1/2225* (2013.01); *H02J 50/10* (2016.02)

(58) Field of Classification Search
None
See application file for complete search history.

(56) References Cited

U.S. PATENT DOCUMENTS 10,417,550 B2 * 9/2019 Kwon ...................... H04B 5/79
10,516,208 B2   12/2019 Lee et al.
(Continued)

FOREIGN PATENT DOCUMENTS

JP     2017091152 A    5/2017
KR     101574322 B1   12/2015
(Continued)

OTHER PUBLICATIONS

Korean Intellectual Property Office, Office Action in Korean Patent Application No. 10-2020-0126380, dated Jul. 29, 2022, 5 pages.

*Primary Examiner* — Julian D Huffman
*Assistant Examiner* — Sadia Kousar
(74) *Attorney, Agent, or Firm* — Schwabe Williamson & Wyatt (57) ABSTRACT

Provided is a coil pattern designed for achieving different functions of wireless charging and magnetic security transmission (MST) using one coil within a limited area. A composite coil pattern for wireless charging and MST includes a first terminal, a second terminal, a coil pattern connecting the first terminal to the second terminal; and an MST pattern portion connected to the coil through a connection line branching from an outer periphery of the coil, wherein the MST pattern portion is at one side in a direction with respect to the coil, and the MST pattern portion includes a plurality of lines parallel to the direction, and the plurality of lines are lines connecting an inner end located close to the coil to an outer end located far from the coil, and such that the plurality of lines are in serial connection with each other, when an inner end of a first line and an inner end of a second line next to the first line from among the plurality of lines are connected to each other, an outer end of the second line and an outer end of a third line next to the second line may be connected to each other.

20 Claims, 4 Drawing Sheets

(51) Int. Cl.
*H02J 50/10* (2016.01)
*H04B 5/79* (2024.01)

(56) References Cited

U.S. PATENT DOCUMENTS

| | | | | |
|---|---|---|---|---|
| 2008/0315311 | A1* | 12/2008 | Okamoto | H01Q 1/2225 29/601 |
| 2018/0322316 | A1* | 11/2018 | Kurz | H01F 27/2804 |
| 2019/0012585 | A1* | 1/2019 | Cho | H04B 5/0081 |
| 2019/0067819 | A1* | 2/2019 | Noh | H01Q 1/52 |
| 2021/0159587 | A1* | 5/2021 | Lee | H01Q 1/38 |

FOREIGN PATENT DOCUMENTS

| | | | | |
|---|---|---|---|---|
| KR | 20140181639 A | * | 12/2015 | |
| WO | WO-2019088708 A1 | * | 5/2019 | H01Q 1/2208 |

* cited by examiner

COMPOSITE COIL PATTERN FOR WIRELESS CHARGING AND MAGNETIC SECURE TRANSMISSION

CROSS-REFERENCE TO RELATED APPLICATION

This application is based on and claims priority under 35 U.S.C. § 119 to Korean Patent Application No. 10-2020-0126380 filed on Sep. 28, 2020 in the Korean Intellectual Property Office, which claims priority to Korean Patent Application No. 10-2020-0089851, filed on Jul. 20, 2020 in the Korean Intellectual Property Office, the disclosures of which are incorporated by reference herein in their entireties.

BACKGROUND

1. Field

One or more embodiments relate to a composite coil pattern for wireless charging and magnetic secure transmission (MST).

2. Description of the Related Art

Wireless charging, which has been recently applied to smartphones, uses a coil-type antenna to transmit and receive magnetic fields. Because near field communication (NFC) antennas for communication and magnetic secure transmission (MST) antennas for electronic payments are coils that use a magnetic field, both need to be complexly designed together with a wireless charging coil within a limited area.

Due to the limited area, there is increasing interest in a method of designing a wireless charging coil to also act as an MST coil. In this case, the difference in methods of designing the two coils becomes an issue in the design.

In the case of the wireless charging coil, because the induced current must be transmitted to a circuit without loss to receive wireless power, performance is improved as low resistance characteristics are secured. In contrast, in the case of the MST coil, if a predetermined resistance value or more is not secured, the current increases rapidly, and the circuit or coil may not withstand the internal pressure and be damaged.

SUMMARY

One or more embodiments include a coil pattern designed for achieving different functions of wireless charging and a magnetic secure transmission (MST) using one coil within a limited area.

However, these problems are exemplary, and the scope of the disclosure is not limited thereby.

Additional aspects will be set forth in part in the description which follows and, in part, will be apparent from the description, or may be learned by practice of the presented embodiments of the disclosure.

According to one or more embodiments, a composite coil pattern for wireless charging and magnetic security transmission includes: a first terminal, a second terminal, a coil connecting the first terminal to the second terminal; and a magnetic security transmission (MST) pattern portion connected to the coil through a connection line branching from an outer periphery of the coil, wherein the MST pattern portion is at one side in a direction with respect to the coil, the MST pattern portion includes a plurality of lines parallel to the direction, the plurality of lines connect an inner end located close to the coil and an outer end located far from the coil, and when an inner end of a first line from among the plurality of lines and an inner end of a second line next to the first line are connected to each other, an outer end of the second line and an outer end of a third line next to the second line are connected to each other, so that the plurality of lines are connected in series.

According to one or more embodiments, when the outer end of the second line and the outer end of the third line next to the second line, from among the plurality of lines, are connected to each other, an inner end of the third line and an inner end of a fourth line next to the third line may be connected to each other.

According to one or more embodiments, at least one inner end of each of the plurality of lines may be located along an outer periphery of the coil.

According to one or more embodiments, the inner end and the outer end may be bent to be connected to adjacent lines.

According to one or more embodiments, one end of the MST pattern portion may be connected to the connection line branching from the outer periphery line of the coil, and the other end of the MST pattern portion may form a third terminal, and the third terminal may be at an outer periphery of the MST pattern portion.

According to one or more embodiments, the first terminal may be selectively used as an input terminal for wireless charging or an input terminal for MST, the second terminal may be an output terminal for wireless charging, and the third terminal may be an output terminal for MST.

According to one or more embodiments, both the coil and the MST pattern portion may be on the same plane, and outer ends of the plurality of lines may be formed on the same plane and formed perpendicular to the direction.

According to one or more embodiments, the width of the plurality of lines may be less than the width of the coil, and the width of the inner end and the outer end may be wider than the width of the plurality of lines.

Other aspects, features, and advantages other than those described above will become apparent from the following drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Since the disclosure may be applied in various ways and have various embodiments, certain embodiments will be illustrated in the drawings and described in detail in the detailed description. Effects, features, and a method of achieving the disclosure will be obvious by referring to example embodiments of the disclosure with reference to the attached drawings. The disclosure may, however, be embodied in many different forms and should not be construed as being limited to the embodiments set forth herein.

Hereinafter, embodiments of the disclosure will be described in detail with reference to the accompanying drawings, and when describing with reference to the drawings, the same or corresponding components are assigned the same reference numerals, and redundant descriptions thereof will be omitted.

In the below embodiments, the terms of a singular form may include plural forms unless otherwise mentioned.

It will be further understood that the terms "comprises" and/or "comprising" used herein specify the presence of stated features or elements, but do not preclude the presence or addition of one or more other features or elements.

In the drawings, the sizes of elements may be exaggerated for clarity of illustration. For example, the size and thickness of each element shown in the drawings are arbitrarily shown for convenience of description, and thus the disclosure is not necessarily limited to what is shown.

It will be understood that when a region, element, unit, block, or module is referred to as being "formed on," another region, element, unit, block, or module, it can be directly or indirectly formed on the other region, element, unit, block, or module. That is, for example, intervening regions, elements, units, blocks, or module may be present.

It will be understood that when a region, element, unit, block, or module is referred to as being "connected to," another region, element, unit, block, or module, it can be directly or indirectly connected to the other region, element, unit, block, or module. That is, for example, intervening regions, elements, units, blocks, or module may be present.

Figure 1:
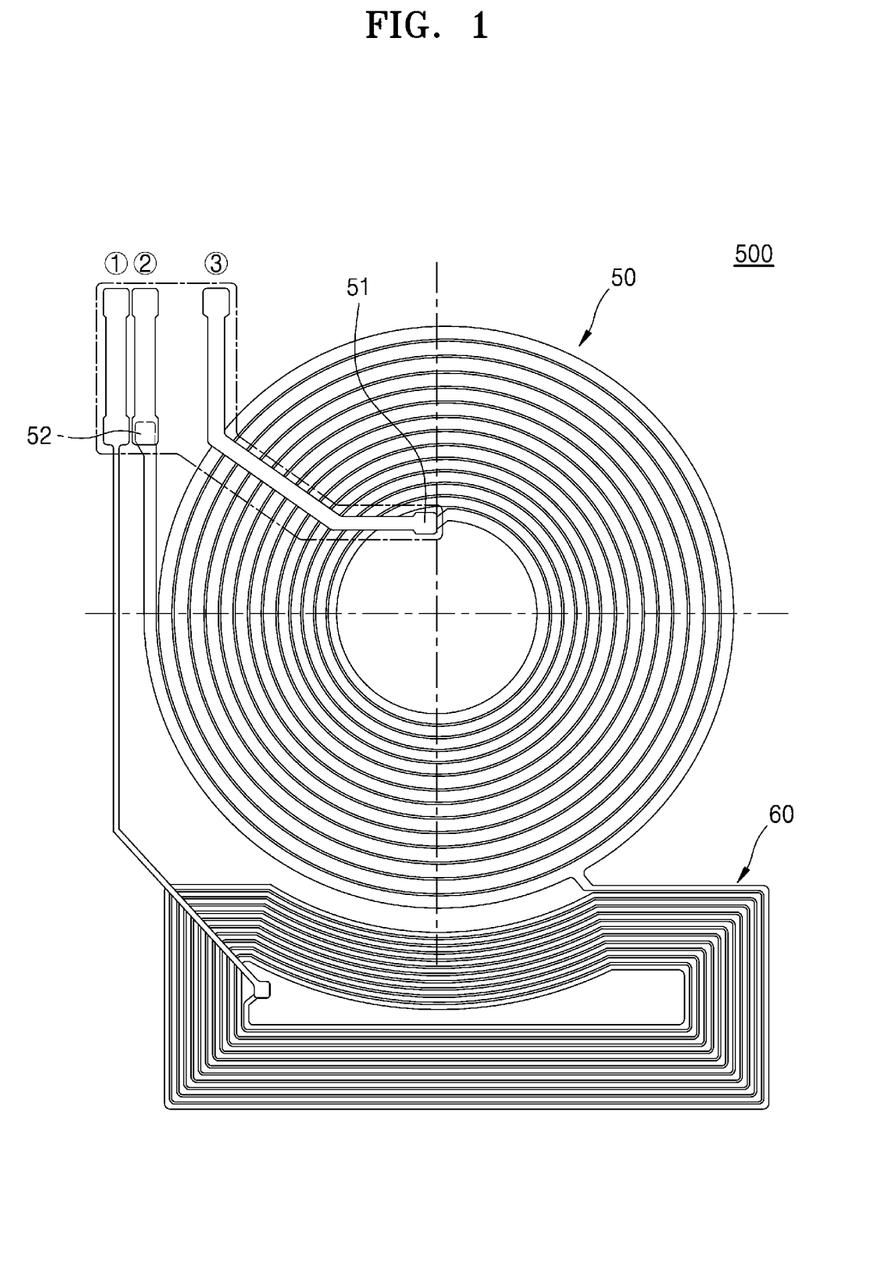
FIG. 1 shows a general coil pattern 500 for wireless charging and magnetic secure transition (MST)

FIG. 1 shows a general coil pattern 500 for wireless charging and magnetic secure transition (MST).

Referring to FIG. 1, the general coil pattern 500 for wireless charging and MST may include a wireless charging coil 50 and an MST coil 60.

For example, the wireless charging coil 50 may connect a first terminal 51 to a second terminal 52. The wireless charging coil 50 may be a pattern line wound a plurality of times.

The MST coil 60 may be connected to the wireless charging coil 50 through a connection line branching from the outer periphery of the wireless charging coil 50. The MST coil 60 connected to the connection line may form a wound pattern separately from the wireless charging coil 50 in the vicinity of the wireless charging coil 50. In detail, the MST coil 60 may be a spiral wound pattern, and the wireless charging coil 50 and the MST coil 60 may form different spiral patterns from each other. Thus, the center of the spiral of the wireless charging coil 50 and the center of the spiral of the MST coil 60 may be different from each other.

One end of the MST coil 60 may be connected to the connection line branching from the outer periphery line of the wireless charging coil 50, and the other end of the MST coil 60 may be connected to a third terminal 53.

During a wireless charging operation through the coil pattern 500, the first terminal 51 may be used as an input terminal and the second terminal 52 may be used as an output terminal. During an MST operation through the coil pattern 500, the first terminal 51 may be used as an input terminal and the third terminal 53 may be used as an output terminal. Thus, the first terminal 51 may be selectively used as an input terminal for wireless charging and an input terminal for MST, and the second terminal 52 may be an output terminal for wireless charging, and the third terminal 53 may be an output terminal for MST.

In a general coil pattern 500, as described above, by extending and forming a separate MST coil 60 of a spiral pattern through a connection line branching from the outer periphery line of a wireless charging coil 50, an additionally increased resistance value may be secured in an MST operation. In other words, in the wireless charging operation, only the first terminal 51, the second terminal 52, and the wireless charging coil 50 may be used to form a low resistance value, and in the MST operation, by using the first terminal 51 and the third terminal 53, the wireless charging coil 50 and the MST coil 60 may be simultaneously used to form a high resistance value.

In a general coil pattern 500, because the wireless charging coil 50 and the MST coil 60 each simultaneously generate magnetic fields during an MST operation, a region in which the magnetic field is offset may occur. For example, between the wireless charging coil 50 region and the MST coil 60 region, a region in which a first magnetic field generated by the wireless charging coil 50 and a second magnetic field generated by the MST coil 60 may be offset from each other may occur. For example, when a credit card payment is performed, a region in which a magnetic reader of a POS terminal cannot recognize the payment information may occur.

In addition, because the MST coil 60 is formed in a spiral pattern, an empty space may inevitably be generated inside the spiral pattern, and accordingly, there may be inefficiency in securing a maximum length of lines within a limited area. In other words, it is advantageous to reduce the general space occupied by the coil pattern 500, and because the MST coil 60 is provided to secure the required resistance value during the MST operation, the space as much as the empty space inside the MST coil 60 may be wasted.

In addition, because the MST coil 60 is formed in a spiral pattern, the third terminal 53 connected to the MST coil 60 may inevitably be present in the spiral pattern. Therefore, in order to electrically connect the third terminal 53 to the outside of the MST coil 60, a separate layer or a separate lead line may be required.

Figure 2:
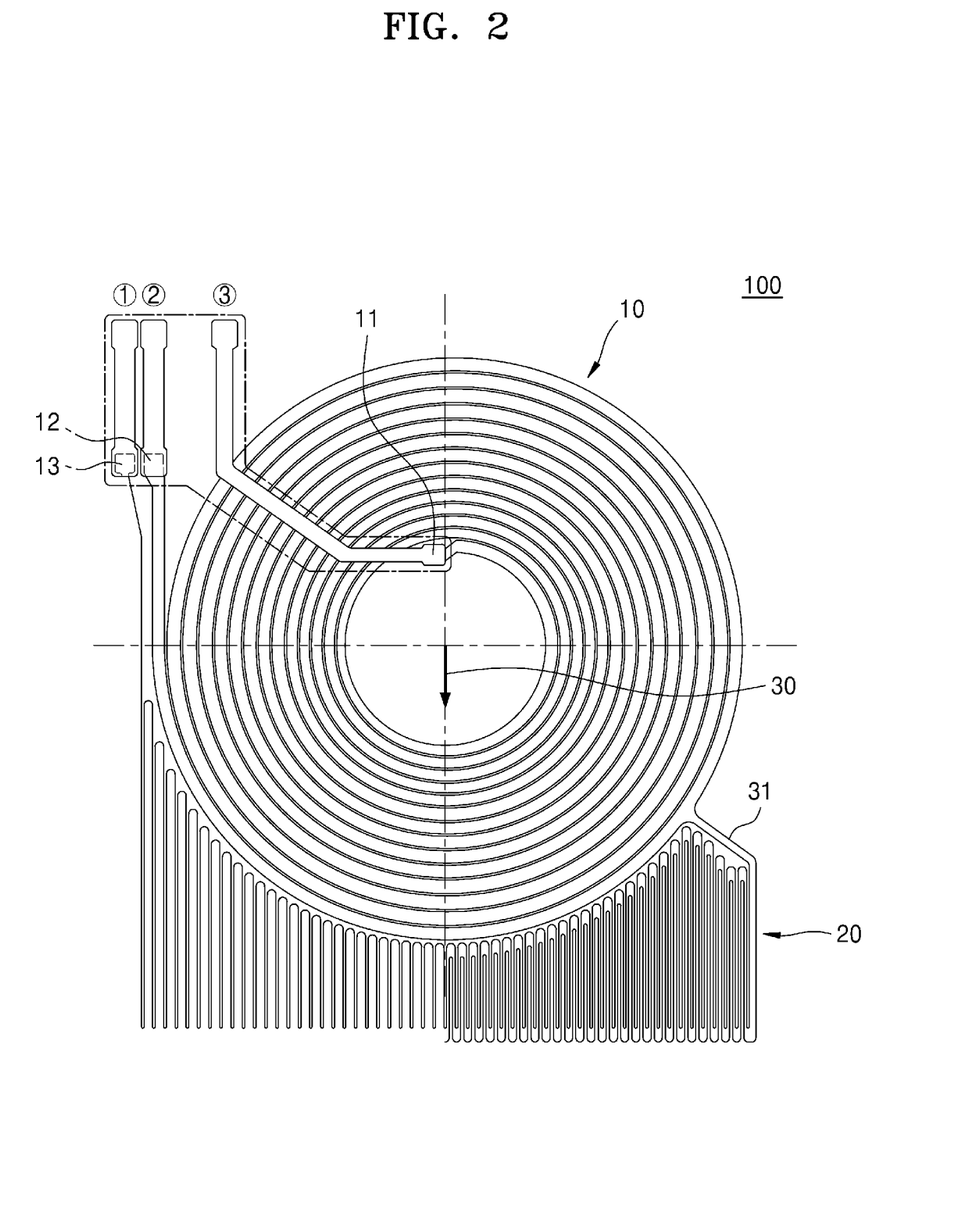
FIG. 2 shows a composite coil pattern 100 for wireless charging and MST according to an embodiment.
Figure 3:
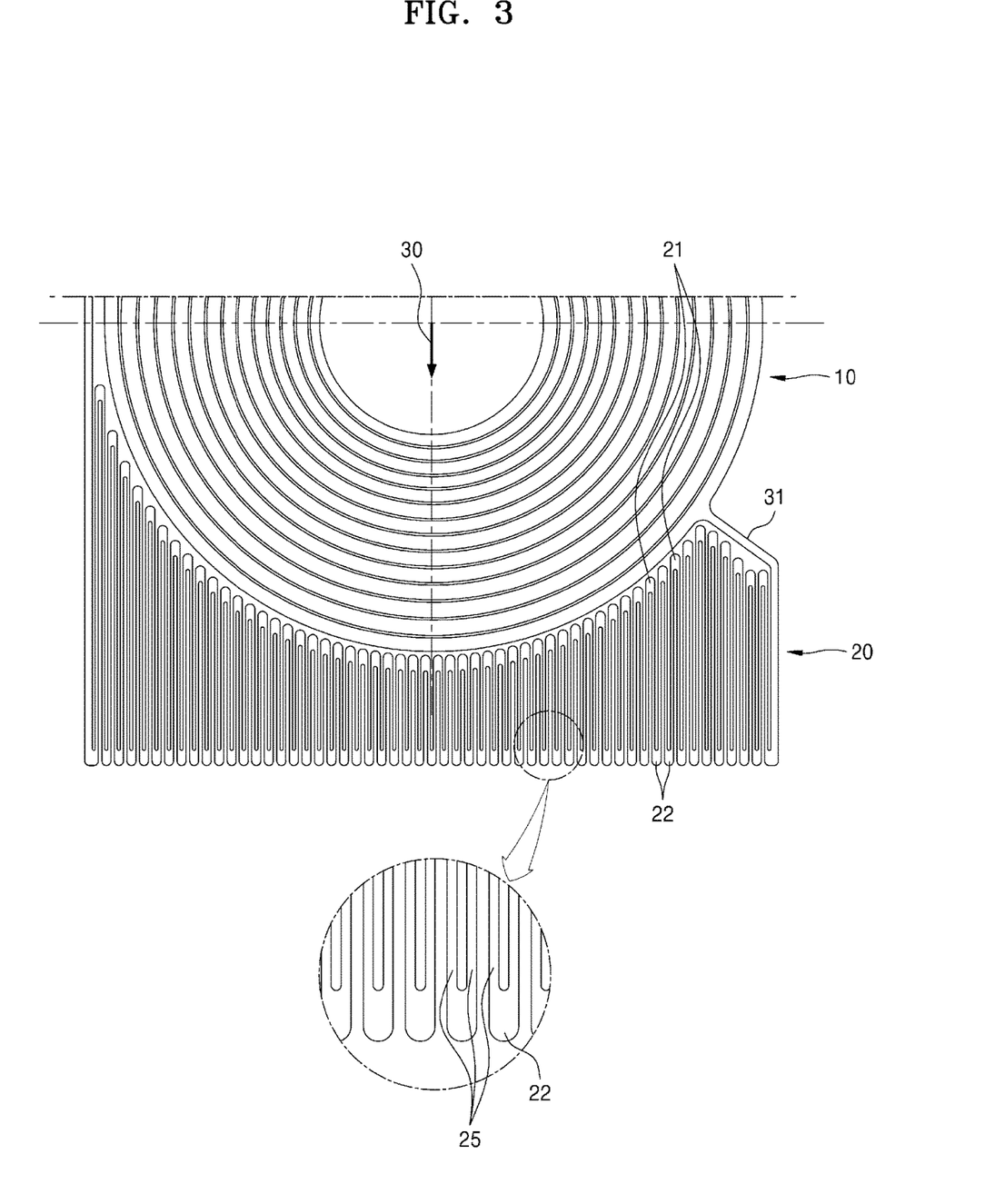
FIGS. 3 and 4 are enlarged views of the composite coil pattern 100 for wireless charging and MST illustrated in FIG. 2.
Figure 4:
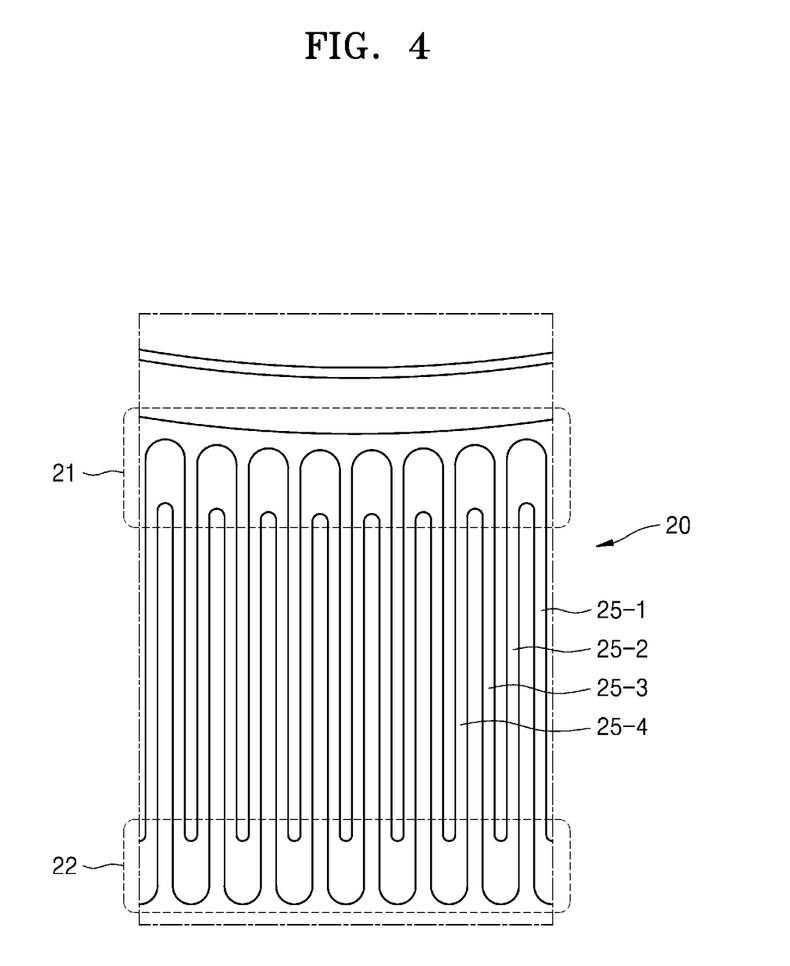

FIG. 2 shows a composite coil pattern 100 for wireless charging and MST according to an embodiment. FIGS. 3 and 4 are enlarged views of the composite coil pattern 100 for wireless charging and MST illustrated in FIG. 2.

The composite coil pattern 100 according to an embodiment may solve the problem in which a magnetic field is offset in previous methods. At the same time, the composite coil pattern 100 according to an embodiment may have a structure capable of securing a sufficient resistance value required for the MST operation in a smaller area than the previous method (the coil pattern 500).

Referring to FIGS. 2 to 4, the composite coil pattern 100 for wireless charging and MST according to an embodiment may include a wireless charging coil portion 10 and an MST pattern portion 20.

The wireless charging coil portion 10 may include a first terminal 11, a second terminal 12, and a wireless charging coil (i.e., coil pattern 15) connecting the first terminal 11 to the second terminal 12. The wireless charging coil pattern 15 may connect the first terminal 11 to the second terminal 12, and may be a pattern line wound a plurality of times.

The MST pattern portion 20 may be connected to the wireless charging coil pattern 15 through a connection line 31 branching from the outer periphery of the wireless charging coil pattern 15. The MST pattern portion 20 may be located in a direction 30 with respect to the wireless charging coil pattern 15. The MST pattern portion 20 may form a separate pattern from the wireless charging coil pattern 15.

The MST pattern portion 20 according to an embodiment may include a plurality of lines 25 including first to fourth lines 25-1 to 25-4 parallel to the direction 30. The direction 30 may be a direction towards which the MST pattern portion 20 is directed with respect to the wireless charging coil portion 10, that is, a direction in which the MST pattern portion 20 is located with respect to the wireless charging coil portion 10. Each of the plurality of first to fourth lines 25-1, 25-2, 25-3 and 25-4 included in the MST pattern portion 20 may be parallel to the direction 30.

The plurality of lines 25 may be lines connecting an inner end 21 located close to the wireless charging coil portion 10 and an outer end 22 located far from the wireless charging coil portion 10. The direction 30 may correspond to a direction from the inner end 21 to the outer end 22 with respect to each of the plurality of lines 25.

The plurality of lines 25 included in the MST pattern portion 20 may be connected in series. Referring to FIG. 4, details of the above description are as below. When any one of the first line 25-1 and the second line 25-2 next to the first line 25-1 from among the plurality of lines 25 are connected at the inner end 21, the second line 25-2 and the third line 25-3 next to the second line 25-2 may be connected at the outer end 22, and when the second line 25-2 and the third line 25-3 are connected at the outer end 22, the third line 25-3 and the fourth line 25-4 next to the third line 25-3 may be connected at the inner end 21, so that the plurality of lines 25 are connected in series.

In other words, when the inner end 21 of the first line 25-1 from among the plurality of lines 25 and the inner end 21 of the second line 25-2 next to the first line 25-1 are connected to each other, the outer end 22 of the second line 25-2 and the outer end 22 of the third line 25-3 next to the second line 25-2 may be connected to each other, so that the plurality of lines 25 are connected in series.

When the outer end 22 of the second line 25-2 and the outer end 22 of the third line 25-3 next to the second line 25-2 from among the plurality of lines 25 are connected to each other, the inner end 21 of the third line 25-3 and the inner end 21 of the fourth line 25-4 next to the third line 25-3 may be connected to each other, so that the plurality of lines 25 are connected in series.

As described above, the line (e.g., 25-1, 25-2, 25-3, and 25-4) forming the MST pattern portion 20 may be in a meander or zigzag shape. Here, in the meander shape or the zigzag shape, the plurality of lines 25 may be parallel to each other except for parts where adjacent lines are connected to each other (i.e., a curved part, the inner end 21, and the outer end 22). The plurality of lines in the meander or zigzag form may be straight lines and may be arranged in parallel with the direction 30 toward which the MST pattern portion 20 is directed with respect to the wireless charging coil portion 10.

One end of the MST pattern portion 20 may be connected to the connection line 31 branching from the outer periphery line of the wireless charging coil pattern 15, and the other end of the MST pattern portion 20 may be connected to a third terminal 13.

The composite coil pattern 100 according to an embodiment may use the first terminal 11 as an input terminal and the second terminal 12 as an output terminal during a wireless charging operation. The composite coil pattern 100 may use the first terminal 11 as an input terminal and the third terminal 13 as an output terminal during an MST operation. Thus, the first terminal 11 may be selectively used as an input terminal for wireless charging and an input terminal for MST, the second terminal 12 may be an output terminal for wireless charging, and the third terminal 13 may be an output terminal for MST.

In the composite coil pattern 100, by additionally extending and forming the MST pattern portion 20 through the connection line 31 branching from the outer periphery line of the wireless charging coil pattern 15, an additional increased resistance value may be secured in the MST operation. In other words, in the wireless charging operation, only the first terminal 11, the second terminal 12, and the wireless charging coil pattern 15 may be used to form a low resistance value, and in the MST operation, by using the first terminal 11 and the third terminal 13, the wireless charging coil pattern 15 and the MST pattern 20 may be simultaneously used to form a high resistance value.

The MST pattern portion 20 may be formed as described above in the composite coil pattern 100 according to an embodiment. Accordingly, the length of the line of the MST pattern portion 20 may be maximized in a smaller area than an existing coil pattern (e.g., the coil pattern 500), without an empty space. Therefore, the composite coil pattern 100 may secure an additional resistance value in a smaller area than an existing coil pattern (e.g., the coil pattern 500).

In addition, in the composite coil pattern 100 according to an embodiment, by forming the MST pattern portion 20 as described above, the third terminal 13 may be at an outer periphery of the MST pattern portion 20. Therefore, unlike the coil patterns of the related art (e.g., the coil pattern 500), in the composite coil pattern 100, a lead line using a separate layer may not need to be formed to electrically connect the third terminal 13 to an external circuit (not shown).

In addition, in the composite coil pattern 100 according to an embodiment, because the MST pattern portion 20 is not a spiral structure, a problem in which the magnetic field is offset as in previous methods may not occur. In other words, because the MST coil 60 is formed in a spiral pattern in the general coil pattern 500, a region in which the first magnetic field generated by the wireless charging spiral coil 50 and the second magnetic field generated by the MST coil 60 of a spiral shape are offset from each other may occur. However, in the composite coil pattern 100 according to an embodiment, because the MST pattern portion 20 is formed in a meander shape as described above, a side effect of the magnetic fields generated by the wireless charging coil portion 10 and the MST pattern portion 20 being offset from each other may be minimized.

In addition, in the plurality of lines 25 of the MST pattern portion 20 according to an embodiment, a magnetic field generated in a straight line section may be in an opposite direction to a magnetic field generated in a very next straight line section. That is, a direction of the magnetic field generated by the first line 25-1 may be the opposite to a direction of the magnetic field generated by the second line 25-2, and a direction of the magnetic field generated by the second line 25-2 may be the opposite to a direction of the magnetic field generated by the third line 25-3. Therefore, the magnetic fields generated by the plurality of straight lines 25 in the left and right directions may offset each other. Thus, the net magnetic field in the left and right directions generated by the MST pattern portion 20 may correspond to approximately 0. In addition, because the magnetic field generated by the plurality of straight lines 25 is substantially perpendicular to the magnetic field generated by the wireless charging coil pattern 15, a probability in which the magnetic fields generated by the plurality of straight lines 25 offset the magnetic field generated by the wireless charging coil pattern 15 may be significantly reduced. For example, in the MST operation, the degree of a magnetic field generated by the wireless charging coil pattern 15 and a magnetic field generated by the plurality of straight lines 25 offsetting each other may be minimized.

In the MST pattern portion 20, the inner end 21 and the outer end 21 excluding the straight section may generate a net magnetic field. Current may flow in the same direction on the inner end 21 and the outer end 22 of the plurality of lines 25, and the direction may be the same as the direction in which current flows in the wireless charging coil pattern 15. Therefore, the net magnetic field generated by the plurality of inner ends 21 may reinforce the magnetic field generated by the wireless charging coil pattern 15. Similarly, the net magnetic field generated by the plurality of outer ends 22 may reinforce the magnetic field generated by the wireless charging coil pattern 15. Therefore, the MST pattern portion 20 may generate the effect of having two or more windings at the outer periphery of the wireless charging coil pattern 15.

For the reinforcing effect, at least one of the inner ends 21 of the plurality of lines included in the MST pattern portion 20 may be located along the outer periphery of the wireless charging coil pattern 15. That is, the at least one of the plurality of inner ends 21 of the plurality of lines 25 may be arranged to correspond to the outer periphery of the wireless charging coil pattern 15, to provide an effect of further winding at the outer periphery of the wireless charging coil pattern 15.

According to one or more embodiments, the MST pattern portion 20 may be designed to satisfy a required resistance value or more for a minimum region. According to one or more embodiments, the width of the plurality of lines 25 may be less than the width of the wireless charging coil pattern 15. According to one or more embodiments, the width of the inner end 21 and the outer end 22 may be wider than the width of the plurality of lines 25. According to one or more embodiments, the width of the inner end 21 and the outer end 22 may correspond to the width of the wireless charging coil pattern 15. However, embodiments of the disclosure are not limited thereto.

While the disclosure has been particularly shown and described with reference to example embodiments thereof, it will be understood by one of ordinary skill in the art that various changes in form and details may be made therein without departing from the spirit and scope of the disclosure. Accordingly, the true technical scope of the disclosure shall be defined by the technical spirit of the appended claims.

According to one or more embodiments as described above, different functions of wireless charging and an MST may be achieved using one coil within a limited area.

However, the scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A composite coil pattern for wireless charging and magnetic security transmission (MST), the composite coil pattern comprising:
   a wireless charging coil portion including a first terminal, a second terminal, and a coil connecting the first terminal to the second terminal; and
   a magnetic security transmission (MST) pattern portion connected to the coil through a connection line branching from a curved outer periphery of the coil, wherein:
   the MST pattern portion is at one side in a direction with respect to the coil,
   the MST pattern portion extends in a zig zag shape and includes a plurality of lines which extend parallel to the direction,
   a first portion of the plurality of lines comprises inner ends located close to the coil and arranged to correspond to the curved outer periphery of the coil, and outer ends located far from the coil,
   a second portion of the plurality of lines, adjacent to the first portion of the plurality of lines, comprises inner ends located close to the connection line and arranged to correspond to the connection line and outer ends located far from the connection line,
   an inner end of a first line from among the plurality of lines and an inner end of a second line next to the first line are connected to each other, and an outer end of the second line and an outer end of a third line next to the second line are connected to each other, so that the plurality of lines are connected in series,
   the inner ends and the outer ends of the plurality of lines are bent to be connected to adjacent parallel lines of the plurality of lines,
   the inner ends of the first portion of the plurality of lines are bent along the curved outer periphery of the coil, and
   the inner ends of the second portion of the plurality of lines are bent along the connection line.

2. The composite coil pattern for wireless charging and magnetic security transmission of claim 1, wherein, when the outer end of the second line and the outer end of the third line next to the second line, from among the plurality of lines, are connected to each other, an inner end of the third line and an inner end of a fourth line next to the third line are connected to each other.

3. The composite coil pattern for wireless charging and magnetic security transmission of claim 1, wherein at least one inner end of each of the first portion of the plurality of lines is located along the curved outer periphery of the coil.

4. The composite coil pattern for wireless charging and magnetic security transmission of claim 1, wherein:
   the connection line has a first end coupled to the curved outer periphery of the coil and an opposing second end, and
   one end of the MST pattern portion is connected to the second end of the connection line, and an opposite end of the MST pattern portion forms a third terminal.

5. The composite coil pattern for wireless charging and magnetic security transmission of claim 4, wherein:

the first terminal is selectively used as an input terminal for wireless charging or an input terminal for MST, the second terminal is an output terminal for wireless charging, and and the third terminal is an output terminal for MST.

6. The composite coil pattern for wireless charging and magnetic security transmission of claim 4, wherein:

lengths of the second portion of the plurality of lines increase moving from the second end of the connection line to the first end of the connection line.

7. The composite coil pattern for wireless charging and magnetic security transmission of claim 6, wherein:

lengths of the first portion of the plurality of lines decrease and then increase moving from the second end of the connection line to the third terminal.

8. The composite coil pattern for wireless charging and magnetic security transmission of claim 4, wherein:

lengths of the first portion of the plurality of lines decrease moving from the second end of the connection line to a midpoint of the coil and increase moving from the midpoint of the coil to the third terminal.

9. The composite coil pattern for wireless charging and magnetic security transmission of claim 1, wherein:

both the coil and the MST pattern portion are on a same plane, and the outer ends of the plurality of lines are formed on a same plane and formed perpendicular to the direction.

10. The composite coil pattern for wireless charging and magnetic security transmission of claim 1, wherein:

a width of the first portion of the plurality of lines is less than a width of the coil, and a combined width of the first and second portions of the plurality of lines is greater than the width of the coil.

11. The composite coil pattern for wireless charging and magnetic security transmission of claim 1, wherein the outer ends of the first and second portions of the plurality of lines are arranged along a straight line.

12. The composite coil pattern for wireless charging and magnetic security transmission of claim 11, wherein:

lengths of the first portion of the plurality of lines vary according to distances between the outer periphery of the coil and the straight line, and lengths of the second portion of the plurality of lines vary according to distances between the connection line and the straight line.

13. The composite coil pattern for wireless charging and magnetic security transmission of claim 1, wherein the curved outer periphery of the coil is circular.

14. A composite coil pattern for wireless charging and magnetic security transmission (MST), the composite coil pattern comprising:

a wireless charging coil portion including a first terminal, a second terminal, and a coil connecting the first terminal to the second terminal; and a magnetic security transmission (MST) pattern portion connected to the coil through a connection line branching from a curved outer periphery of the coil, wherein:

the MST pattern portion is at one side in a direction with respect to the coil, the MST pattern portion extends in a back and forth pattern and includes a plurality of lines which extend parallel to the direction, a first portion of the plurality of lines comprises inner ends located close to the coil and arranged to correspond to the curved outer periphery of the coil, and outer ends located far from the coil, a second portion of the plurality of lines, adjacent to the first portion of the plurality of lines, comprises inner ends located close to the connection line and arranged to correspond to the connection line and outer ends located far from the connection line, an inner end of a first line from among the plurality of lines and an inner end of a second line next to the first line are connected to each other, and an outer end of the second line and an outer end of a third line next to the second line are connected to each other, so that the plurality of lines are connected in series, the inner ends and the outer ends of the plurality of lines are bent to be connected to adjacent parallel lines of the plurality of lines, the inner ends of the first portion of the plurality of lines are bent along the curved outer periphery of the coil, and the inner ends of the second portion of the plurality of lines are bent along the connection line.

15. The composite coil pattern for wireless charging and magnetic security transmission of claim 14, wherein the MST pattern portion extends in switchbacks in the back and forth pattern.

16. A composite coil pattern for wireless charging and magnetic security transmission (MST), the composite coil pattern comprising:

a wireless charging coil portion including a first terminal, a second terminal, and a coil connecting the first terminal to the second terminal; and a magnetic security transmission (MST) pattern portion connected to the coil through a connection line branching from a curved outer periphery of the coil, wherein:

the MST pattern portion comprises a line which extends from the connection line to a third terminal;

the line extends in a back and forth pattern along one side of the coil at an outer periphery of the coil; and one side of the back and forth pattern corresponds to the curved outer periphery of the coil, wherein:

a first portion of the line comprises inner ends located close to the coil and arranged to correspond to the curved outer periphery of the coil, and outer ends located far from the coil, and a second portion of the line, adjacent to the first portion of the line, comprises inner ends located close to the connection line and arranged to correspond to the connection line and outer ends located far from the connection line.

17. The composite coil pattern for wireless charging and magnetic security transmission of claim 16, wherein the line extends in switchbacks in the back and forth pattern.

18. The composite coil pattern for wireless charging and magnetic security transmission of claim 16, wherein the line includes adjacent parallel portions connected to one another at the one side of the back and forth pattern by respective bent portions of the line.

19. The composite coil pattern for wireless charging and magnetic security transmission of claim 18, wherein the adjacent parallel portions of the line are connected to one another at an opposing side of the back and forth pattern by respective bent portions of the line.

20. The composite coil pattern for wireless charging and magnetic security transmission of claim 18, wherein lengths of the adjacent parallel portions vary according to the curved outer periphery of the coil.

* * * * *